United States Patent [19]

Manning

[11] E Re. 29,734

[45] Reissued Aug. 15, 1978

[54] WELL BORE DATA-TRANSMISSION APPARATUS WITH DEBRIS CLEARING APPARATUS

[75] Inventor: Kenneth G. Manning, Houston, Tex.

[73] Assignee: Schlumberger Technology Corporation, New York, N.Y.

[21] Appl. No.: 820,187

[22] Filed: Jul. 29, 1977

Related U.S. Patent Documents

Reissue of:

[64] Patent No.: 3,764,970
Issued: Oct. 9, 1973
Appl. No.: 263,024
Filed: Jun. 15, 1972

[51] Int. Cl.[2] ..... G01V 1/40

[52] U.S. Cl. ..... 340/18 NC; 175/232; 340/18 LD

[58] Field of Search ..... 340/18 NC, 18 LD; 175/40, 232

[56] References Cited

U.S. PATENT DOCUMENTS

| | | | |
|---|---|---|---|
| 2,700,131 | 1/1955 | Otis et al. | 340/18 LD |
| 3,309,656 | 3/1967 | Godbey | 340/18 R |
| 3,713,089 | 1/1973 | Claycomb | 340/18 LD |

*Primary Examiner*—Howard A. Birmiel
*Attorney, Agent, or Firm*—David L. Moseley; William R. Sherman; Edward M. Roney

[57] ABSTRACT

In the representative embodiment of the apparatus of the present invention disclosed herein, a first ported or grooved cylindrical member is coaxially disposed within a drill string for directing drilling fluids flowing through the apparatus along one or more selected flow paths [through] *and* a second ported or grooved cylindrical member [which] is coaxially arranged in the drill string adjacent to the first member for rotation in a transverse plane cutting the flow paths to cyclically obstruct these flow paths. An electric motor is cooperatively coupled by a shaft to the rotatable member for driving this member at a selected speed for developing an acoustic signal of a desired frequency as the flow paths are momentarily obstructed at periodic intervals. To prevent jamming of the flow-controlling members which would otherwise occur should debris carried in the circulating drilling fluid become lodged therebetween, the rotating member is cooperatively coupled to the motor shaft to move away from the other member in response to significant increase in the torque required to drive the rotating member. Moreover, upon an increase of the pressure differential across the two members as might occur by an accumulation of debris or the like between the two members tending to at least slow the rotating member, the other member is arranged to move away from the rotating member. Biasing means are respectively provided to maintain the flow-controlling members in their normal positions as well as to restore the two members to their normal operating positions adjacent to one another once the debris has been cleared from between the members by the continued flow of the drilling fluid.

27 Claims, 4 Drawing Figures

FIG. 1
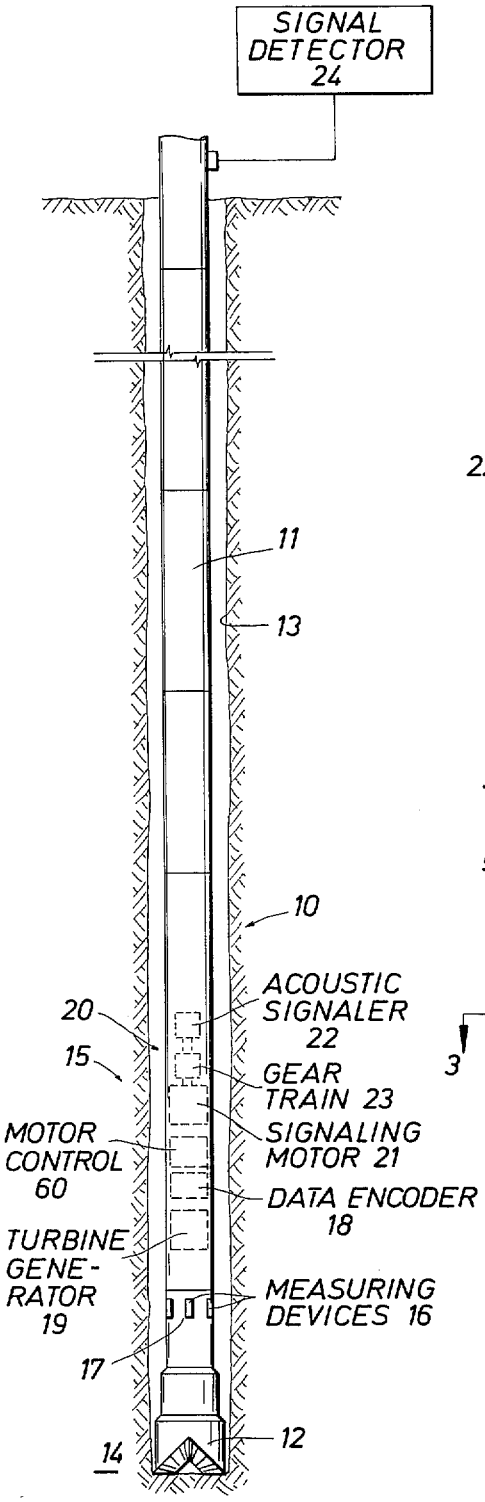
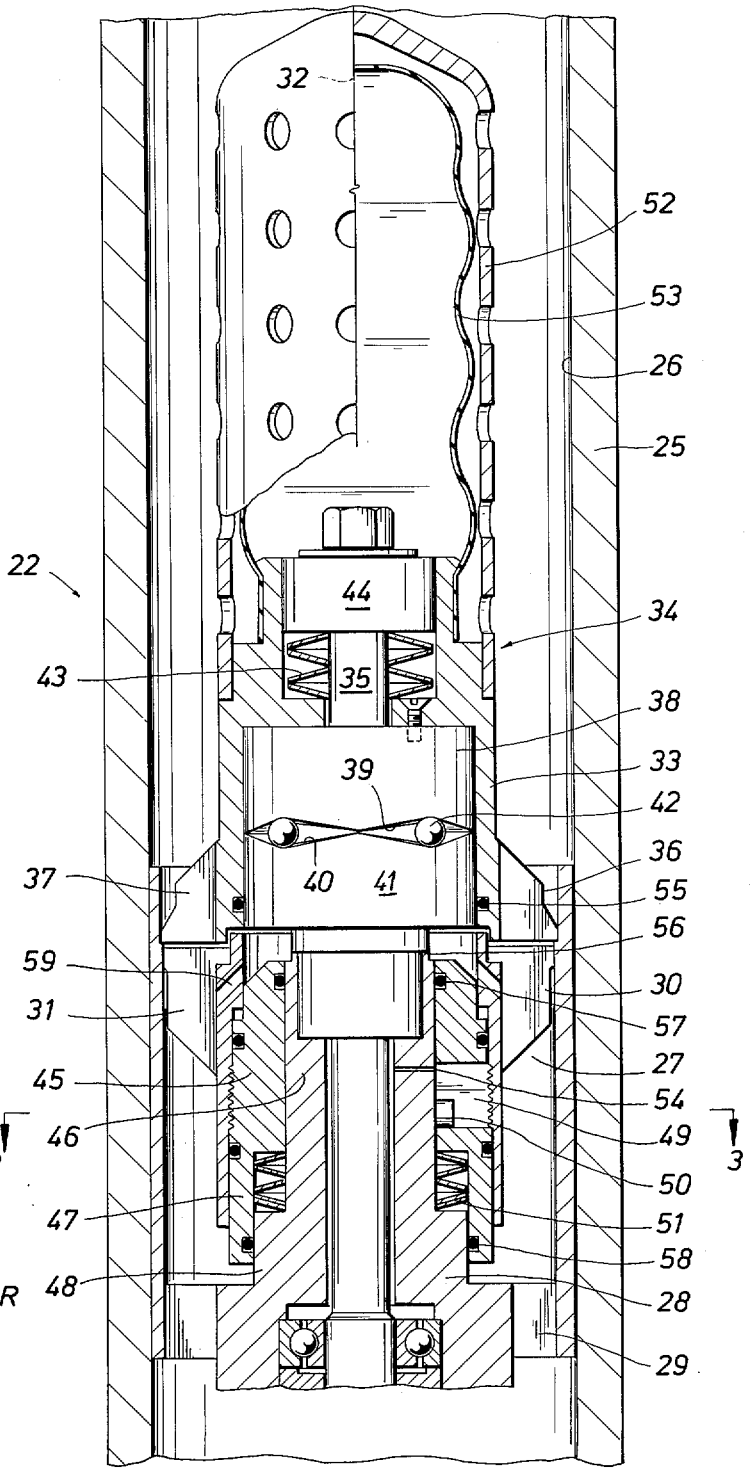
FIG. 2

WELL BORE DATA-TRANSMISSION APPARATUS WITH DEBRIS CLEARING APPARATUS

Matter enclosed in heavy brackets [ ] appears in the original patent but forms no part of this reissue specification; matter printed in italics indicates the additions made by reissue.

Various downhole signaling devices have been proposed heretofore for transmitting data representative of one or more downhole conditions to the surface during the drilling of a borehole. One of the more-promising devices of this nature is a fluid-dynamic transducer or a so-called "siren" (such as shown generally at "62" in U.S. Pat. No. 3,309,656) that is selectively arranged for developing acoustic signals which are transmitted to the surface through the circulating mud stream in the drill string. A typical one of these sirens includes a grooved or ported rotor which is rotatively driven at one or more selected speeds across one or more jets of drilling mud issuing from a fixed grooved or ported stator for producing acoustic signals at frequencies related to the design of the siren members, the properties of the drilling mud, and the rotational speed of the rotor. Thus, by selectively controlling the rotational speed of the rotor in accordance with variations in a measured downhole condition, the siren can be selectively operated as required for transmitting coded acoustic signals to the surface which are representative of the measurements of the downhole condition.

Although sirens such as these have other advantages, one of the paramount advantages in using these signaling devices is that acoustic signals can be efficiently produced thereby within a frequency span of about 10 to 300-cycles/second. As noted in the aforementioned patent, frequencies above this range are subject to significant attenuation; and it is, therefore, preferred to operate these sirens to produce signals at frequencies between about 10 to 60-cycles/second. Although signaling devices such as these have shown significant promise for commercial applications, the narrow spacing between the two siren members required to produce satisfactory acoustic signals makes these sirens particularly susceptible to being jammed or easily obstructed either by drilling mud solids or by well debris and the like which is prevalent in the circulating mud stream in a typical borehole.

Accordingly, it is an object of the present invention to provide a new and improved well bore data-transmission system for producing selectively-coded acoustic signals in a selected frequency range in debris-bearing well bore fluids such as a circulating stream of drilling mud.

This and other objects of the present invention are attained by providing a well tool adapted to be connected in a pipe string such as a drill string having a drill bit dependently coupled thereto and arranged for excavating a borehole as a drilling fluid is circulated through a fluid passage in the tool and the drill string. To generate distinctive acoustic signals in the circulating fluid representative of one or more downhole measurements, acoustic-signaling means on the tool include a selectively-controlled electric motor rotatively driving a flow-controlling member which is normally positioned immediately adjacent to another flow-controlling member slidably arranged within the fluid passage so as to cyclically vary the degree of flow obstruction presented by the two flow-controlling members in cooperation with one another for producing an acoustic signal. The acoustic-signaling means further include control means responsive to operating conditions tending to slow the motor, such as either an increased pressure differential across the flow-controlling members or an increased requirement in driving torque, for temporarily separating one or the other of the two members from its companion so as to allow debris and the like to be carried free of the two members by the flowing mud stream. The control means are further responsive to the cessation of the operating condition causing slowing of the motor, such as a decrease in either the pressure differential or the driving torque to their usual operating ranges, for restoring the flow-controlling members to their respective signal-producing positions once debris has been carried free of the two members.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 shows a new and improved well tool arranged in accordance with the present invention as it will appear while coupled in a drill string during the course of a typical drilling operation;

FIG. 2 depicts a preferred embodiment of the acoustic signaler employed with the well tool shown in FIG. 1;

Figure 3:
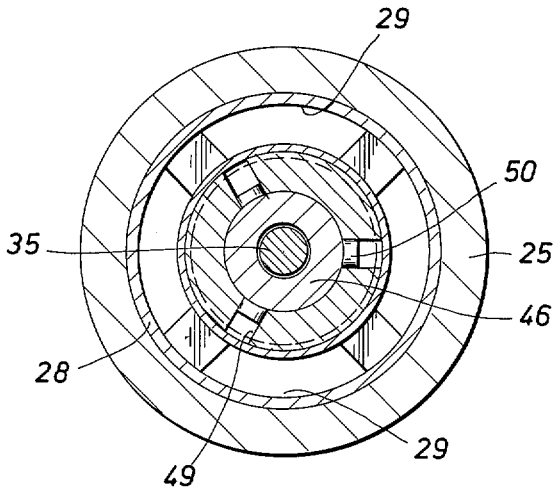
FIG. 3 is a cross-sectional view taken along the lines "3—3" in FIG. 2.

Turning now to FIG. 1, a new and improved well tool 10 arranged in accordance with the present invention is depicted coupled in a typical drill string 11 having a rotary drill bit 12 dependently coupled thereto and adapted for excavating a borehole 13 through various earth formations as at 14. As the drill string 11 is rotated by a typical drilling rig (not shown) at the surface, substantial volumes of the drilling fluid or so-called "mud" are continuously pumped downwardly through the tubular drill string and discharged from the drill bit 12 to cool the bit as well as to carry earth borings removed by the bit to the surface as the mud is returned upwardly along the borehole 13 exterior of the drill string. As is typical, the mud stream is circulated by employing one or more high-pressure mud pumps (not shown) which continuously draw the fluid from a storage pit or surface vessel (not shown) for subsequent recirculation by the mud pumps. It will be appreciated, therefore, that the circulating mud stream flowing through the drill string 11 serves as a transmission medium that is well suited for transmitting acoustic signals to the surface at the speed of sound in the particular drilling fluid.

In accordance with the principles of the present invention, data-transmitting means 15 are arranged on the well tool 10 and include one or more condition-responsive devices, as at 16 and 17, respectively coupled to an appropriate measurement encoder 18 operatively arranged to produce a series of electrical coded data signals that are representative of the measurements being obtained by the condition-responsive devices. Although a self-contained battery power supply could be employed, as shown at 19 it is preferred to employ a reaction-type turbine driving a generator for utilizing the circulating mud stream as a motivating source to generate electric power for operation of the new and improved data-transmitting means 15. As will subsequently be explained in greater detail, the data-transmitting means 15 further include acoustic signaling means 20 including an electric motor 21 coupled to the encoder 18 and operatively arranged to respond to its coded output signals for rotatively driving an acoustic signaler 22 by way of a typical gear train 23 to successively interrupt or obstruct the flow of the drilling fluid through the drill string 11. The resulting acoustic signals produced by the acoustic signaler 22 will be transmitted to the surface through the mud stream flowing within the drill string 11 as encoded representations or data signals indicative of the one or more downhole conditions respectively sensed by the condition-measuring devices 16 and 17. As these data signals are successively transmitted to the surface, they are detected and converted into meaningful indications or records by suitable acoustic signal detecting-and-recording apparatus 24 such as that disclosed in either U.S. Pat. No. 3,309,656, U.S. Pat. No. 3,488,629, or U.S. Pat. No. 3,555,504.

Turning now to FIG. 2, a partially cross-sectioned elevational view is shown of a preferred embodiment of the new and improved acoustic signaler 22. As seen there, the tool 10 includes a tubular body 25 which is cooperatively arranged in a typical manner with appropriate end connections (not shown) to allow the body to be tandemly coupled in the drill string 11. The tubular body 25 includes an axial fluid passage 26 for conducting the drilling fluid flowing through the drill string 11 to the drill bit 12 therebelow. As illustrated, the new and improved acoustic signaler 22 includes an annular ported or internally grooved flow-directing member 27 which is coaxially mounted for limited longitudinal movement around an annular support 28 which is, in turn, arranged within the flow passage 26 and secured to the body 25 in some convenient manner. A plurality of flow passages, as at 29, are arranged in the support 28 below the flow-directing member to conduct drilling fluids on past the support. As will subsequently be explained in greater detail, in the preferred embodiment of the acoustic-signaling means 2:0 the flow-directing member 27 is provided with a plurality of radially directed teeth or projections, as at 30, having a substantially rectangular or square cross-sectional configuration which are respectively distributed equally around the flow-directing member for defining a plurality of circumferentially spaced flow passages, as at 31, parallel to the longitudinal or central axis 32 of the tool body 25.

In its preferred embodiment, the acoustic signaler 22 further includes a rotatable ported or externally grooved flow-obstructing member 33 which is cooperatively coupled by torque-responsive means 34 to the upper end of the output shaft 35 of the gear train 23 and coaxially disposed within the central fluid passage 26 for rotation in a transverse plane of rotation normally lying immediately above the flow-directing member 27. The exterior of the rotating flow-obstructing member 33 is provided with a number of equally spaced, outwardly directed radial projections, as at 36, respectively having a substantially rectangular or square configuration which are cooperatively shaped to define a plurality of circumferentially spaced longitudinal flow passages 37.

Although different dimensions and shapes, relative numbers, and relative proportions may be used for the flow passages and the radial projections of the flow-controlling members, it is preferable that the projections 36 on the rotating member 33 either be slightly wider or substantially complemental with respect to the flow passages 31 of the flow-directing member 27. In the preferred embodiment of the present invention, the flow-controlling member 27 and 33 are arranged with their respective projections 30 and 36 of about the same diameter and are closely spaced so that the opposed flat faces of the projections will be normally separated a distance in the order of 0.020 to 0.030-inches.

In this manner, when the flow-obstructing member 33 is angularly oriented with respect to the flow-directing member 27 so as to align the projections 36 with the passages 31, there will be a substantial momentary obstruction to the flow of the circulating mud stream through the tool 10. As pointed out in the aforementioned U.S. Pat. No. 3,309,656, by making the several passages 31 and the projections 36 substantially square or rectangular, rotation of the flow-obstructing rotor 33 in relation to the flow-directing stator 27 will repetitively obstruct the fluid passage 26 to a substantial degree and then re-open the passage as the radial projections are progressively moved into registration and then out of alignment with the grooves for producing cyclically-varying sinusoidal pressure signals in the flowing drilling mud of significant amplitude at the design fundamental frequency. In other words, by virtue of the rectangular or square configurations of the flow passages 31 and the radial projections 36, the effective flow area for the drilling mud passing through the tool 10 will vary continuously in a linear fashion so as to minimize the unwanted generation of acoustic signals of significant amplitudes at high-order harmonic frequencies.

Of particular significance to the present invention, it will be appreciated that instead of being fixed to its driving shaft as is the case for the siren disclosed in the aforementioned U.S. Pat. No. 3,309,656, the flow-obstructing member 33 is co-rotatively coupled to the shaft 35 by only the torque-responsive means 34 for permitting the rotor to also move longitudinally in relation to the shaft between its normal position as depicted in FIG. 2 and at least one other relatively-higher position where the rotor is more distant from the flow-directing member 27. To provide the torque-responsive means 34, the rotating member 33 is provided with an inwardly-enlarged portion 38 having a downwardly facing annular surface 39 which is longitudinally spaced above an upwardly facing annular surface 40 defined by an enlarged shoulder 41 on the shaft 35. As illustrated, the opposed surfaces 39 and 40 are shaped to define vertically undulating camming surfaces which extend completely around the circumference of the shoulders 38 and 41, respectively, and are maintained apart by a plurality of cam members such as three balls as at 42. Biasing means, such as a compression spring 43 have a predetermined spring force mounted around the shaft 35 between a shoulder 44 thereon and the upper face of the enlarged portion 38 on the rotating member 33, are cooperatively arranged for normally urging the rotating member downwardly toward the flow-directing member 27 so as to normally maintain the opposed faces of the projections 30 and 36 on the two members closely spaced under usual flow conditions. As depicted, in this situation, the balls 42 are respectively retained in enlarged spaces defined by the opposed undulated surfaces 39 and 40 so as to maintain the opposed faces of the projections 30 and 36 at their selected minimum spacing. It will, of course, be recognized that this close spacing will be maintained only so long as the balls 42 remain in the enlarged spaces defined by the low spots or valleys of the undulating surfaces 39 and 40. On the other hand, when rotation of the shaft 35 in relation to the flow-obstructing member occurs, this slippage will carry the balls 42 between the high spots or peaks of the undulating surfaces 39 and 40 to elevate the flow-obstructing member in relation to the shaft and thereby widen the gap between the flow-controlling members 27 and 33.

As previously mentioned, the flow-directing member 27 is cooperatively arranged for limited longitudinal movement in relation to the annular support 28. To accomplish this, the flow-directing member 27 is preferably shaped as illustrated to provide an inwardly enlarged upper portion 45 which is disposed around a reduced-diameter portion 46 of the support 28 and a lower portion 47 which is disposed around an enlarged-diameter portion 48 of the annular support. One or more inwardly opening, elongated longitudinal slots, as at 49, are provided around the interior bore of the flow-directing member 27 for receiving outwardly-projecting lugs, as at 50, on the annular support 28 so as to correspondingly limit the longitudinal travel of the flow-directing member in relation to the support and the body 25. Biasing means are provided such as a compression spring 51 having a predetermined spring rate which is arranged between the lower portion 47 of the flow-directing member 27 and the enlarged portion 48 of the support 28 for normally urging the flow-directing member upwardly against the lugs 50.

Accordingly, it will be appreciated that the biasing forces provided by the springs 43 and 51 will be selected to maintain the flow-controlling members 27 and 33 at their desired longitudinal spacing in relation to one another for producing acoustic signals of a desired characteristic during the normal operation of the acoustic signaler 22. However, should there be a downwardly acting force on the flow-directing member 27 sufficient to overcome the upwardly directed biasing action of the spring 51, the flow-directing member will be moved downwardly along the support 28 until such time that the downwardly acting forces on the flow-controlling member are countered by the upwardly acting force imposed by the further compression of the spring. Similarly, should the rotating member 33 become slowed or halted with a sufficient force to overcome the biasing force of the spring 43, rotation of the shaft 35 in relation to the flow-obstructing member will be effective for carrying the inclined portions of the camming surfaces 39 and 40 along the balls 42 to elevate the flow-obstructing member in relation to the shaft 35 as well as the flow-directing member 27.

Although the springs 43 and 51 could be sized to respectively provide sufficient biasing forces, it is preferred to augment these spring forces with pressure-biasing arrangements so as to minimize the physical sizes of the springs as well as to make the acoustic signaler 22 more responsive to varying borehole conditions. To accomplish this, an inverted cylindrical dome, as at 52, is secured to the upper end of the flow-obstructing member 33 and extended upwardly well above the upper end of the shaft 35. The dome 52 is perforated and its interior is lined with an elastomeric bag 53. Thus, by filling the interior of the bag 53 with a suitable oil or the like, the oil therein will be maintained at the pressure of the drilling fluid at that point in the fluid passage 26. It will, of course, be recognized by those skilled in the art that this entrapped oil can be directed through suitable passages and clearance spaces, as at 54 for example, to the other parts of the acoustic-signaling means 20 for lubrication as well as maintaining the internal portions of other parts of the system at elevated pressures to at least minimize the entrance of the drilling mud.

To provide a pressure-derived downward biasing force on the flow-obstructing member 33, sealing means, such as an O-ring 55, are arranged between the flow-obstructing member and the shoulder 41 and the lower end of the shoulder 41 is arranged to maintain a sliding seal with the upper end 56 of the annular shoulder 28. Similarly, seals, as at 57 and 58, are arranged between the upper and lower ends of the flow-directing member 27 and the adjacent portions 46 and 48 of the support 28 to isolate the oil-filled slots 49 and the space enclosing the spring 51. A passage 59 is provided in the flow-directing member to normally maintain the space between the opposed faces of the flow-controlling members 27 and 33 at the lower downstream pressure of the drilling fluids. Thus, by virtue of the lower downstream pressure normally existing in the space between the flow-controlling members 27 and 33, the higher upstream pressure will be effective for urging the flow-obstructing member downwardly against the balls 42. Conversely, the higher pressure of the oil in the enclosed spaces 49 will urge the flow-directing member 27 upwardly with a force proportional to the difference in the areas sealed by the O-rings 57 and 58. The total upward biasing force is arranged, however, to be effective only so long as the pressure between the flow-controlling members 27 and 33 is lower than the upstream pressure while the acoustic signaler 22 is running without interruption.

In the normal course of operation of the acoustic-signaling means 20 of the present invention, the flow-obstructing member 33 will be rotated at a selected constant speed for producing alternating acoustic signals having a waveform dictated by the shapes of the openings 31 and the projections 36 and at a frequency which is determined by the rotational speed of the rotating member as well as the number of the openings and projections. As various borehole conditions being measured by the measuring devices 16 and 17 change during the course of the drilling operation, the data encoder 18 will be effective for controlling the motor 21 so as to produce, for example, signals of different frequencies such as described in detail in the aforementioned U.S. Pat. No. 3,309,656. It will, of course, be appreciated that other signal-transmission modes may also be employed with the data-transmitting means 15. For example, by momentarily operating the motor 21 so as to either retard or advance the rotation of the flow-obstructing member 33, the phase relationship of the resulting output acoustic signal may be selectively varied sufficiently either in relation to previous output signals or in relation to a constant reference signal for producing other forms of distinctive acoustic signals which are also representative of the borehole conditions being monitored by the measuring devices 16 and 17. It will, of course, be appreciated that the details of such selective regulation of the motor 21 for driving the flow-obstructing member 33 to obtain different modes of signal transmission are not necessary for an understanding of the principles of the present invention.

Accordingly, in the usual situation, the flow-obstructing member 33 is steadily rotated at a speed governed by the operation of the driving motor 21. So long as the flow-obstructing member 33 is free to rotate with relation to the flow-directing member 27, the acoustic signals produced by the acoustic signaler 22 will be transmitted to the surface by way of the drilling fluid within the drill string 11 for detecting and recording by the surface apparatus 24. However, as it is not at all uncommon, debris and the like which is commonly found in a borehole, such as at 13, during a typical drilling operation will be swept to the surface along with the returning drilling mud where significant portions of such debris will be picked up by the mud pumps and discharged into the drill string 11. As a result, those skilled in the art will appreciate that it is quite likely that pieces of wire, sticks, and other solid foreign materials will, from time to time, enter one or more of the grooves 37 in the flow-obstructing member 33 and must be carried past the flow-directing member 27 if rotation of the rotor is to continue. However, all too frequently, it has been found that the torque applied to the flow-obstructing member is insufficient to cut or break debris which is spanning the flow-controlling members 27 and 33 at any given moment. Thus, when this situation arises with a signaling device such as that shown in the aforementioned Pat. No. 3,309,656, the rotor described there will be easily jammed to halt the further operation of that signaling device.

In keeping with the objects of the present invention, however, the new and improved acoustic signaler 22 is co-operatively arranged for operation of a debris-laden drilling mud. Thus, with the acoustic-signaling means 20 of the present invention, should debris such as a piece of wire or a stick become lodged in two openings, as at 31 and 37, which are then aligned and thereby halt the flow-obstructing member 33 in a slightly advanced angular position where these two openings are then substantially out of registration, the resulting increased pressure differential in the flowing stream of drilling fluid will be effective for longitudinally shifting the [flow-directiong] *flow-directing* member 27 downwardly along the support 28 to open an increased flow area for the passage of drilling mud past the acoustic signaler 22. When this occurs, the upstream pressure will be imposed on the upper face of the projections 30 to develop a sufficient force to momentarily overcome the spring 51 and the upward pressure-biasing force on the flow-directing member 27.

It will be recognized that as the flow-directing member 27 moves downwardly in relation to the flow-obstructing member 33, the motor 21 will correspondingly turn the rotating member slightly as permitted by the length and rigidity of the piece of debris that is then lodged in the acoustic signaler 22. In some instances, separation of the flow-controlling members 27 and 33 will be sufficient for pulling the piece of jamming debris free of the flow-directing member so that the continuing flow of the drilling mud will be effective for washing the debris out of the flow-obstructing member to restore the rotational freedom of the rotating member. Thus, once a piece of debris has been cleared from the acoustic signaler 22, the flow-obstructing member 33 will be freed and the upwardly directed biasing action of the spring 51 will be effective for returning the flow-directing member 27 to its normal position immediately below the flow-obstructing member. Thus, the operation of acoustic-signaling means 20 will continue as before until the acoustic signaler 22 again becomes temporarily jammed by additional debris.

It should be recognized, however, that downward movement of the flow-directing member 27 caused by an increased pressure differential across the flow-controlling members 27 and 33 is contingent upon the projections 36 remaining in substantial registration with the openings 31 such as will be the case when the debris jamming the signaler 22 is a piece of small-diameter wire or the like. Thus, should the piece of debris jamming the flow-controlling members 27 and 33 be a stick or something of larger diameter, the openings 37 in the rotating member could well be retained in substantial alignment with the openings 31 in the flow-directing member. This would, of course, result in little or no increase in pressure differential across the flow-controlling members 27 and 33 so that there would be no significant force tending to overcome the biasing action of the spring 51 and the pressure-biasing action on the flow-directing member. Accordingly, by virtue of the torque-responsive means 34, should a piece of large debris become lodged in the openings 31 and 37, the continued rotational torque applied to the flow-obstructing member will be sufficient to carry the rotating member upwardly in relation to the flow-directing member and thereby momentarily open up the spacing between the flow-controlling members 27 and 33 sufficiently to hopefully dislodge the debris.

It should be further noted at this point that there may well be debris which cannot be dislodged by simply shifting the flow-controlling members 27 and 33 downwardly or upwardly in relation to one another as the case may be. Ordinarily, this would result in a permanent jamming of the acoustic signaler 22 since the continued torque applied by the motor 21 on the piece of debris linking the flow-controlling members 27 and 33 will simply maintain the debris in a jamming position. However, by virtue of the respective abilities of the flow-controlling members 27 and 33 to separate, it will be appreciated that by reversing the rotation of the motor 21, the respective openings, as at 31 and 37, into which the piece of debris has been lodged can be returned into registration with one another for momentarily positioning a piece of jamming debris in a generally parallel relation to the longitudinal axis 32 so as to hopefully permit the correspondingly increased flow of drilling mud to dislodge the debris. On the other hand, should this fail, reverse rotation of the flow-obstructing member 33 will pull the debris in a different direction and hopefully dislodge the debris. Repeated back and forth reversal of the rotating member 33 will also be likely to cut through many types of debris for ultimately freeing the flow-obstructing member.

In any event, once the piece of jamming debris has been cleared from the acoustic signaler 22, the flow-obstructing member 33 will be quickly returned by its pressure biasing and the spring 43 to its usual position immediately above the flow-directing member 27 and the balls 42 will again assume their usual position. Similarly, the flow-directing member 27 will also be returned upwardly by its pressure biasing and the spring 51. Once this happens, the acoustic signal will of course, be restored to continue the transmission of data or information signals to the surface. It should be noted that clearing of the debris will also flush away any accumulation of drilling mud solids on the jammed flow-controlling members 27 and 33 which will occur when the two members are halted in a misaligned position.

Figure 4:
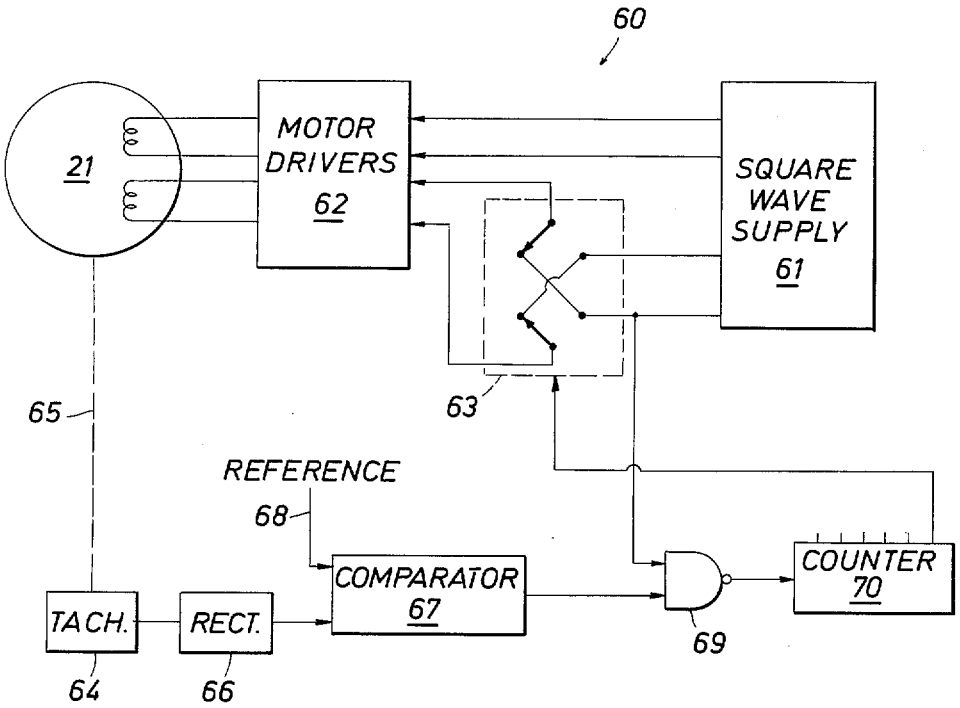
FIG. 4 schematically illustrates a representative control circuit which may be employed in the present invention.

It will, of course, be appreciated that various circuits can be provided to selectively reverse the driving motor 21 for attaining the objects of the present invention. However, in the preferred embodiment of the data-transmitting means 15 of the present invention, motor control circuitry 60 such as depicted in FIG. 4 is cooperatively arranged for alternately reversing the rotation of the motor 21 back and forth so long as the speed of the motor is below a desired speed. As shown there, the motor 21 is a two-phase induction motor which is selectively driven in either rotational direction by a conventional two-phase square wave power supply 61 coupled to typical driver circuits 62 connected to the two windings of the motor. To accomplish the alternate reversals of the motor 21, a typical reversing switch 63, such as a relay or suitable logic gates, is arranged to selectively reverse the leads to one of the motor windings.

To control the reversing switch 63, a typical tachometer 64 is coupled to the shaft 65 of the motor 21 and cooperatively arranged for producing an output voltage which is proportional to the rotational speed of the motor. This output voltage is preferably rectified and filtered as at 66, and supplied to one input of a comparator 67 having a reference voltage, as at 68, supplied to its other input. The output of the comparator 67 is connected to one input of a gate, such as NAND gate 69, having its output connected to the input of a counter 70. The other input of the gate 69 is connected to one of the outputs of the power supply 61 to provide a source of pulses. Any selected one of the outputs of the counter 70 is connected to the reversing switch 63.

Accordingly, in normal operation of the signaler 22, the speed of the motor 21 will be sufficient to maintain the output voltage of the tachometer 64 of such a magnitude that there will be no output signal from the comparator 67. This will correspondingly disable the gate 69 so that there will be no output pulses supplied to the counter 70. Once, however, the motor 21 slows such as when the acoustic signaler 22 first jams, the output voltage of the tachometer 64 will drop so as to produce an output signal from the comparator 67 which, in turn, enables the gate 69. Once the gate 69 is enabled, the pulses from the power supply 61 will be supplied to the counter 70. Thus, each time the number of pulses supplied to the counter 70 reach a number capable of producing an output signal at the connected output of the counter, the reversing switch 63 will be energized or activated to reverse the rotation of the motor 21. The pulses will, of course, continue to be supplied to the counter 70 so long as the speed of the motor 21 is below its normal range. This will, therefore, accomplish a second reversal of the motor 21 once there is a subsequent output from the counter 70 which again energizes or activates the reversing switch 63. Thus, reversal of the motor 21 will be repeated at frequent intervals such as every few seconds or so as long as the tachometer 64 indicates that the speed of the motor is below its normal operating speed and accordingly maintains the gate 69 in an enabled state. It should be noted that rotation of the motor 21 back and forth will successively raise and lower the flow-obstructing member 33 as the balls 42 move back and forth along the camming surfaces 39 and 40.

Accordingly, it will be [aprpreciated] *appreciated* that the present invention has provided new and improved well bore apparatus for transmitting information or data signals representative of one or more downhole conditions to the surface during the course of a drilling operation. By arranging the acoustic signaling means of the present invention to include a rotating flow-obstructing member which is cyclically rotated in the proximity of the flow-directing member as the drilling fluid is circulated past these members, an acoustic signal of a frequency related to the design of these members and the rotational speed of the rotating member is produced. To prevent debris and the like which is typically carried in a circulating stream of drilling mud from jamming the signaling means, the rotating member is cooperatively arranged for rotational and longitudinal movement in relation to its supporting shaft and the flow-directing member is slidably mounted in relation to the tool body to permit the flow-controlling members to be respectively separated thereby opening the normal close spacing between the two members a sufficient amount to allow the drilling fluid to wash the debris free of the acoustic-signaling means. Biasing means are cooperatively arranged for restoring the flow-controlling members to their normal positions once the piece of jamming debris has been cleared from the acoustic-signaling means.

While only a particular embodiment of the present invention has been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. Apparatus adapted for transmitting data signals from a well bore to the surface and comprising:

a body adapted for connection in a pipe string and having a fluid passage arranged to carry debris-bearing fluids between the surface and well bore;

a first signal-producing member cooperatively arranged in said fluid passage for directing at least a portion of a fluid flowing therethrough along at least one selected flow path;

first means including a second signal-producing member cooperatively arranged in said fluid passage adjacent to said first member for rotation at a selected speed in a plane transverse to said flow path for repetitively obstructing said flow path at periodic intervals to cyclically produce acoustic data signals in a fluid flowing through said fluid passage;

second means operable upon at least slowing of said second member below said selected speed in response to an increase in driving torque on said second member for momentarily separating one of said signal-producing members to allow fluid-borne solids flowing through said fluid passage to pass downstream of said signal-producing members; and third means operable upon at least slowing of said second member in response to an increased pressure differential across said signal-producing members for momentarily separating the other of said signal-producing members from said one signal-producing member to allow fluid-borne solids flowing through said fluid passage to pass downstream of said signal-producing members.

2. The apparatus of claim 1 wherein said first means include a rotatable motor, and a rotatable shaft drivingly coupled to said motor; said second means include means cooperatively coupling said second member to said shaft for rotation thereby as well as for movement therealong between an operating position adjacent to said first member and a debris-clearing position more distant therefrom, and first biasing means normally biasing said second member toward its said operating position and yieldable in response to an increased driving torque for said second member characteristic of the slowing of the rotational speed of said second member for allowing said second member to move at least momentarily toward its said debris-clearing position; and said third means include means cooperatively coupling said first member to said body for movement in said fluid passage between an operating position adjacent to said second member and a debris-clearing position more distant therefrom, and second biasing means normally biasing said first member toward its said operating position and yieldable in response to an increased pressure differential characteristic of the slowing of the rotational speed of said second member for allowing said first member to move at least momentarily toward its said debris-clearing position.

3. The apparatus of claim 2 wherein said first biasing means include spring means urging said second member toward its said operating position, and means responsive to pressure forces on said second member urging said second member toward its said operating position.

4. The apparatus of claim 2 wherein said second biasing ameans include spring means urging said first member toward its said operating position, and means responsive to pressure forces on said first member normally urging said first member toward its said operating position and responsive to an increased pressure differential across said signal-producing members for overcoming said spring means and urging said first member toward its said debris-clearing position.

5. The apparatus of claim 2 wherein said motor is a selectively-reversible electric motor; and further including circuit means responsive to the slowing of said second member for selectively reversing the rotational direction of said motor.

6. The apparatus of claim 5 wherein said circuit means are selectively operable for alternately reversing the rotational direction of said motor back and forth so long as said second member is slowed below said selected speed.

7. Apparatus adapted for transmitting data to the surface during the drilling of a borehole and comprising:

a body adapted for connection in a tubular drill string and having a fluid passage arranged to conduct drilling fluids between the surface and a borehole-drilling device dependently coupled therebelow;

a flow director cooperatively arranged for movement in said fluid passage and including at least one opening for directing drilling fluids flowing through said fluid passage along a selected axis;

a signal-producing member coaxially arranged for rotation in said fluid passage and including a plurality of alternately-disposed openings and obstructions angularly spaced from one another and respectively adapted to successively cut across said axis upon rotation of said signal-producing member for cyclically producing acoustic data signals in a drilling fluid flowing through said fluid passage;

motor means adapted for rotating said signal-producing member at at least one selected rotational speed;

torque-responsive means selectively coupling said motor means to said signal-producing member and operable in response to at least slowing of said signal-producing member by fluid-borne debris for momentarily moving said signal-producing member away from said flow director when there is an increase in driving torque on said signal-producing member to allow such debris to be carried away by drilling fluids flowing through said fluid passage; and pressure-responsive means normally maintaining said flow director in an operating position adjacent to said signal-producing member and operable in response to an increase in pressure differential across said [signal-producing member causing] *flow director caused by* at least slowing of said signal-producing member for momentarily moving said flow director away from said signal-producing member to allow such debris to be carried away by drilling fluids flowing through said fluid passage.

8. The apparatus of claim 7 further including control means coupled to sid motor means and responsive to slowing of said signal-producing member below said selected speed for also rotatively moving said signal-producing member back and forth in relation to said flow director so long as said signal-producing member is slowed below said selected speed.

9. The apparatus of claim 8 wherein said motor means include a reversible electric motor; and said control means include means operable upon slowing of said motor for producing an electric signal, and means responsive to said electrical signal for repetitively reversing said motor.

10. The apparatus of claim 7 wherein said torque-responsive means include a rotatable shaft cooperatively coupled to said motor means for rotation thereby, [cluth] *clutch* means adapted for releasably coupling said shaft to said signal-producing member for rotation thereby upon rotation of said motor means, and biasing means cooperatively arranged on said clutch means for co-rotatively coupling said shaft to said signal-producing member only so long as the torque developed by said motor means does not exceed a predetermined magnitude.

11. The apparatus of claim 10 wherein said clutch means include first and second axially spaced, longitudinally undulating opposed surfaces respectively arranged around sid shaft and said signal-producing member, and a plurality of rolling members movably disposed between said opposed surfaces and adapted to remain between the more widely spaced portions thereof so long as said developed torque does not exceed said predetermined magnitude for maintaining said signal-producing member in close proximity to said flow director and to move between the more closely spaced portions of said opposed surfaces when said developed torque exceeds said predetermined torque for moving said signal-producing member away from said flow director.

12. Apparatus adapted for measuring at least one downhole condition while drilling a borehole and comprising:

a body tandemly coupled in a tubular drill string having a borehole-drilling device dependently coupled thereto and defining a fluid passage for circulating drilling fluids between the surface and said borehole-drilling device;

data-signaling means on said body and adapted for producing electrical signals representative of at least one downhole condition;

acoustic-signaling means on said body and including an electric motor coupled to said data-signaling means for selective rotation in response to said electrical signals, a flow-directing member operatively disposed in said fluid passage for movement between longitudinally spaced positions therein and having a plurality of spaced openings cooperatively arranged for directing drilling fluids in selected fluid paths along said fluid passage, and a rotatable flow-obstructing member in said fluid passage and having a plurality of alternately distributed angularly spaced openings and obstructions cooperatively arranged to successively cross said fluid paths upon rotation of said flow-obstructing member for producing cyclic acoustic signals representative of said electrical signals in drilling fluids flowing through said fluid passage;

torque-responsive means cooperatively coupling said flow-obstructing member to said motor for rotation thereby at *at* least one selected rotational speed and responsive to an increase in the torque required to maintain said flow-obstructing member at said selected speed for moving said flow-obstructing member longitudinally away from said flow-directing member upon slowing of said flow-obstructing member to clear fluid-borne debris from between said members; and differential pressure-responsive means responsive to an increased pressure differential across said [flow-obstructing] *flow-directing* member for moving said flow-directing member away from said flow-obstructing member upon slowing of said flow-obstructing member to clear such fluid-borne debris from between sid members.

13. The apparatus of claim 12 further including control means coupled to said motor and responsive to slowing of said flow-obstructing member below said selected speed for alternately rotating said motor back and forth in opposite rotative directions so long as said flow-obstructing member is slowed below said selected speed.

14. The apparatus of claim 12 wherein said flow-obstructing member is upstream of said flow-directing member.

15. The apparatus of claim 12 wherein said differential pressure-responsive means include pressure-biasing means operable upon increased pressure differentials across said members for shifting said flow-directing member along said fluid passage away from said flow-obstructing member and operable upon the subsequent decrease in such increased pressure differentials for shifting said flow-directing member along said fluid passage toward said flow-obstructing member.

16. The apparatus of claim 15 further including control means coupled to said motor and responsive to slowing of said flow-obstructing member below said selected speed for alternately rotating said motor back and forth in opposite rotative directions so long as said flow-obstructing member is slowed below said selected speed.

17. The apparatus of claim 12 wherein said flow-directing member is coaxially arranged in said fluid passage downstream of said flow-obstructing member.

18. Apparatus adapted for measuring at least one downhole condition while drilling a borehole and comprising:

a body tandemly coupled in a tubular drill string having a borehole-drilling device dependently coupled thereto and defining a fluid passage for circulating drilling fluids between the surface and said borehole-drilling device;

data-signaling means on said body and adapted for producing electrical signals representative of at least one downhole condition;

acoustic-signaling means on said body and including an electric motor coupled to said data-signaling means for selective rotation in response to said electrical signals, a flow director coaxially arranged in said fluid passage and having a plurality of spaced openings cooperatively arranged for directing drilling fluids in selected fluid paths along said fluid passage, an annular signal-producing member coaxially arranged in said fluid passage and having a plurality of alternately distributed angularly spaced openings and obstructions cooperatively arranged to successively cross said fluid paths upon rotation of said signal-producing member for producing cyclic acoustic signals representative of said electrical signals in drilling fluids flowing through said fluid passage; and torque-responsive means adapted for selectively driving said signal-producing member including a rotatable shaft coaxially disposed in said fluid passage and cooperatively coupled to said motor for rotation thereby, a first transversely oriented coaxial camming surface on said [surface] *signal* producing member having a plurality of first undulations thereon, a second transversely oriented coaxial camming surface on said shaft opposing said first camming surface and having a plurality of second undulations thereon substantially complementary to said first undulations, a plurality of rolling members disposed between said first and second camming surfaces and in rolling engagement therewith, and first biasing means for normally urging said first camming surface toward said second camming surface to rotate said signal-producing member in a transverse plane adjacent to said flow director as long as said rolling members are respectively disposed within opposed valleys of said undulations and for yielding in response to an increase in driving torque required by said signal-producing member to rotate said signal-producing member in a transverse plane more distant from said flow director as said rolling members are respectively disposed between opposed inclines of said undulations to clear fluid-borne debris from between said flow director and said signal-producing member.

19. The apparatus of claim 18 wherein said first biasing means include spring means.

20. The apparatus of claim 18 wherein said first biasing ameans include spring means and pressure-responsive means cooperatively arranged for urging said signal-producing member toward said flow director with a force related to the pressure differential across said signal-producing member.

21. The apparatus of claim 20 wherein said signal-producing member is upstream of said flow director.

22. The apparatus of claim 18 wherein said flow director is cooperatively arranged for movement between longitudinally spaced positions in said fluid passage and further including second biasing means cooperatively arranged for normally urging said flow director toward said signal-producing member and responsive to increased pressure differentials across said [signal-producing member] *flow director* for yieldably shifting said flow director away from said signal-producing member to clear fluid-borne debris from between said flow director and said signal-producing member.

23. The apparatus of claim 22 wherein said second biasing means include spring means.

24. The apparatus of claim 22 wherein said second biasing means include spring means and first pressure-responsive means cooperatively arranged for urging said flow director toward said signal-producing member so long as said signal-producing member is rotating adjacent to said flow director, and second pressure-responsive means cooperatively arranged for urging said flow director away from said signal-producing member whenever said obstructions on said signal-producing member are opposite said openings on said flow director.

25. The apparatus of claim 24 wherein said first biasing means include spring means and pressure-responsive means cooperatively arranged for urging said signal-producing member toward said flow director with a force related to the pressure differential across said signal-producing member.

26. The apparatus of claim 25 further including control means coupled to said motor and responsive to slowing of said flow-obstructing member below said selected speed for alternately rotating said motor back and forth in opposite rotative directions so long as said flow-obstructing member is slowed below said selected speed.

27. The apparatus of claim 26 wherein said signal-producing member is upstream of said flow director.

* * * * *